United States Patent
Crabtree et al.

(10) Patent No.: US 8,500,839 B2
(45) Date of Patent: Aug. 6, 2013

(54) PANEL FILTER

(75) Inventors: LaMonte A. Crabtree, LaGrange, KY (US); John Davis, Loves Park, IL (US); Daniel R. Haas, Crestwood, KY (US)

(73) Assignee: Clarcor Air Filtration Products, Inc., Jeffersonville, IN (US)

( * ) Notice: Subject to any disclaimer, the term of this patent is extended or adjusted under 35 U.S.C. 154(b) by 398 days.

(21) Appl. No.: 12/768,433

(22) Filed: Apr. 27, 2010

(65) Prior Publication Data

US 2010/0269468 A1 Oct. 28, 2010

Related U.S. Application Data

(60) Provisional application No. 61/173,478, filed on Apr. 28, 2009.

(51) Int. Cl.
*B01D 46/00* (2006.01)
*B31F 1/20* (2006.01)
*B29C 65/54* (2006.01)

(52) U.S. Cl.
USPC .......... 55/499; 55/497; 55/511; 55/521; 55/DIG. 5; 55/DIG. 31; 156/292; 156/293; 264/286

(58) Field of Classification Search
USPC .......... 55/497, 499, 501, 511, 521, DIG. 5, 55/DIG. 31; 156/292, 293; 264/286
See application file for complete search history.

(56) References Cited

U.S. PATENT DOCUMENTS

| | | | |
|---|---|---|---|
| 1,150,490 A | 8/1915 | Bingaman | |
| 2,562,590 A | 7/1951 | Viglietta | |
| 2,869,694 A | 1/1959 | Breckheimer | |
| 3,107,990 A | 10/1963 | Getzin | |
| 3,216,578 A | 11/1965 | Wright et al. | |
| 3,992,173 A | 11/1976 | Wharton et al. | |
| 4,086,071 A | 4/1978 | Champlin | |
| 4,323,379 A | 4/1982 | Shearin | |
| 4,372,763 A | 2/1983 | Champlin et al. | |
| 4,561,587 A | 12/1985 | Wysocki | |
| 4,570,844 A | 2/1986 | Wysocki | |
| 5,230,800 A | 7/1993 | Nelson | |
| 5,419,953 A | 5/1995 | Chapman | |
| 5,505,852 A | 4/1996 | van Rossen | |
| 5,509,950 A | 4/1996 | van de Graaf et al. | |
| 5,531,235 A | 7/1996 | Hassenboehler, Jr. | |
| 5,600,974 A | 2/1997 | Schnegg et al. | |
| 5,611,728 A * | 3/1997 | Arold | 454/158 |
| 5,618,324 A | 4/1997 | Sommer et al. | |

(Continued)

FOREIGN PATENT DOCUMENTS

| | | |
|---|---|---|
| CA | 2 377 703 A1 | 1/2001 |
| WO | WO 98/17368 A1 | 4/1998 |
| WO | WO 01/05486 A1 | 1/2001 |

OTHER PUBLICATIONS

U.S. Appl. No. 12/768,304, filed Apr. 27, 2010, Crabtree et al.

*Primary Examiner* — Robert Clemente
(74) *Attorney, Agent, or Firm* — Reinhart Boerner Van Deuren P.C.

(57) ABSTRACT

A panel filter including a pleated filter media, a frame and a screen is provided. The pleated filter media is supported by the frame which is a one-piece die cut frame or a two-piece die cut frame with integrally formed webbing and border. The pleated filter media is further supported by the screen on one or both sides.

27 Claims, 10 Drawing Sheets

U.S. PATENT DOCUMENTS

| | | | | |
|---|---|---|---|---|
| 5,650,241 | A | 7/1997 | McGee | |
| 5,652,041 | A | 7/1997 | Buerger et al. | |
| 5,704,953 | A | 1/1998 | Stemmer | |
| 5,709,735 | A | 1/1998 | Midkiff et al. | |
| 5,782,944 | A | 7/1998 | Justice | |
| 5,814,219 | A | 9/1998 | Friedmann et al. | |
| 5,820,645 | A | 10/1998 | Murphy, Jr. | |
| 5,840,094 | A | 11/1998 | Osendorf et al. | |
| 6,033,454 | A | 3/2000 | Hoeffken | |
| 6,074,450 | A | 6/2000 | Raber | |
| 6,126,707 | A | 10/2000 | Pitzen | |
| 6,159,318 | A | 12/2000 | Choi | |
| 6,165,242 | A | 12/2000 | Choi | |
| 6,254,653 | B1 | 7/2001 | Choi et al. | |
| D449,100 | S | 10/2001 | Sundet et al. | |
| 6,398,839 | B2 | 6/2002 | Choi et al. | |
| 6,521,011 | B1 | 2/2003 | Sundet et al. | |
| 6,709,480 | B2 | 3/2004 | Sundet et al. | |
| 6,740,136 | B2 | 5/2004 | Duffy | |
| 6,858,297 | B1 * | 2/2005 | Shah et al. | 428/401 |
| 7,112,255 | B2 | 9/2006 | Choi et al. | |
| 7,118,610 | B2 | 10/2006 | Lipner | |
| 7,156,891 | B2 | 1/2007 | Winters et al. | |
| 7,217,333 | B2 | 5/2007 | Sundet et al. | |
| 7,235,115 | B2 * | 6/2007 | Duffy et al. | 55/497 |
| 7,255,723 | B2 | 8/2007 | Choi et al. | |
| 7,503,953 | B2 | 3/2009 | Sundet et al. | |
| 7,537,632 | B2 | 5/2009 | Miller et al. | |
| 7,622,063 | B2 * | 11/2009 | Sundet et al. | 264/151 |
| 8,231,700 | B2 * | 7/2012 | Sundet | 55/499 |
| 2001/0036890 | A1 | 11/2001 | Choi et al. | |
| 2003/0037521 | A1 * | 2/2003 | Chicks et al. | 55/497 |
| 2003/0070406 | A1 | 4/2003 | Duffy | |
| 2003/0089090 | A1 | 5/2003 | Sundet et al. | |
| 2003/0089091 | A1 | 5/2003 | Sundet et al. | |
| 2003/0192293 | A1 | 10/2003 | Choi et al. | |
| 2004/0112526 | A1 | 6/2004 | Choi et al. | |
| 2004/0148915 | A1 | 8/2004 | Lipner | |
| 2004/0182055 | A1 | 9/2004 | Wynn | |
| 2006/0053759 | A1 | 3/2006 | Winters et al. | |
| 2006/0283162 | A1 | 12/2006 | Dent et al. | |
| 2007/0180803 | A1 | 8/2007 | Sundet et al. | |
| 2007/0204574 | A1 | 9/2007 | Workman | |
| 2007/0289273 | A1 | 12/2007 | Boyd | |
| 2007/0294988 | A1 | 12/2007 | Miller et al. | |
| 2008/0105123 | A1 * | 5/2008 | Devine | 95/273 |
| 2009/0199525 | A1 | 8/2009 | Ter Horst | 55/492 |
| 2010/0269467 | A1 * | 10/2010 | Crabtree et al. | 55/499 |
| 2010/0269468 | A1 * | 10/2010 | Crabtree et al. | 55/499 |

* cited by examiner

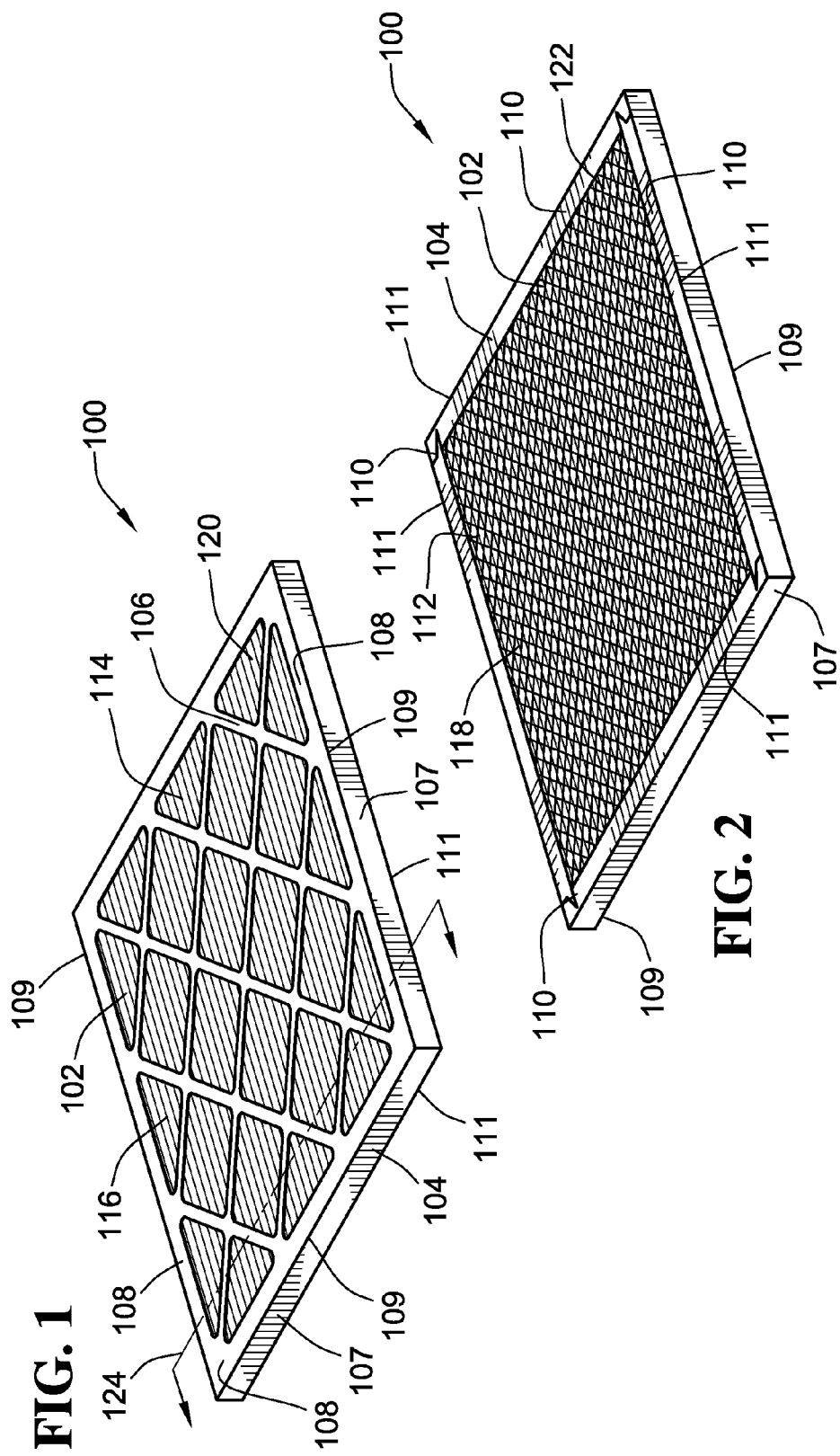

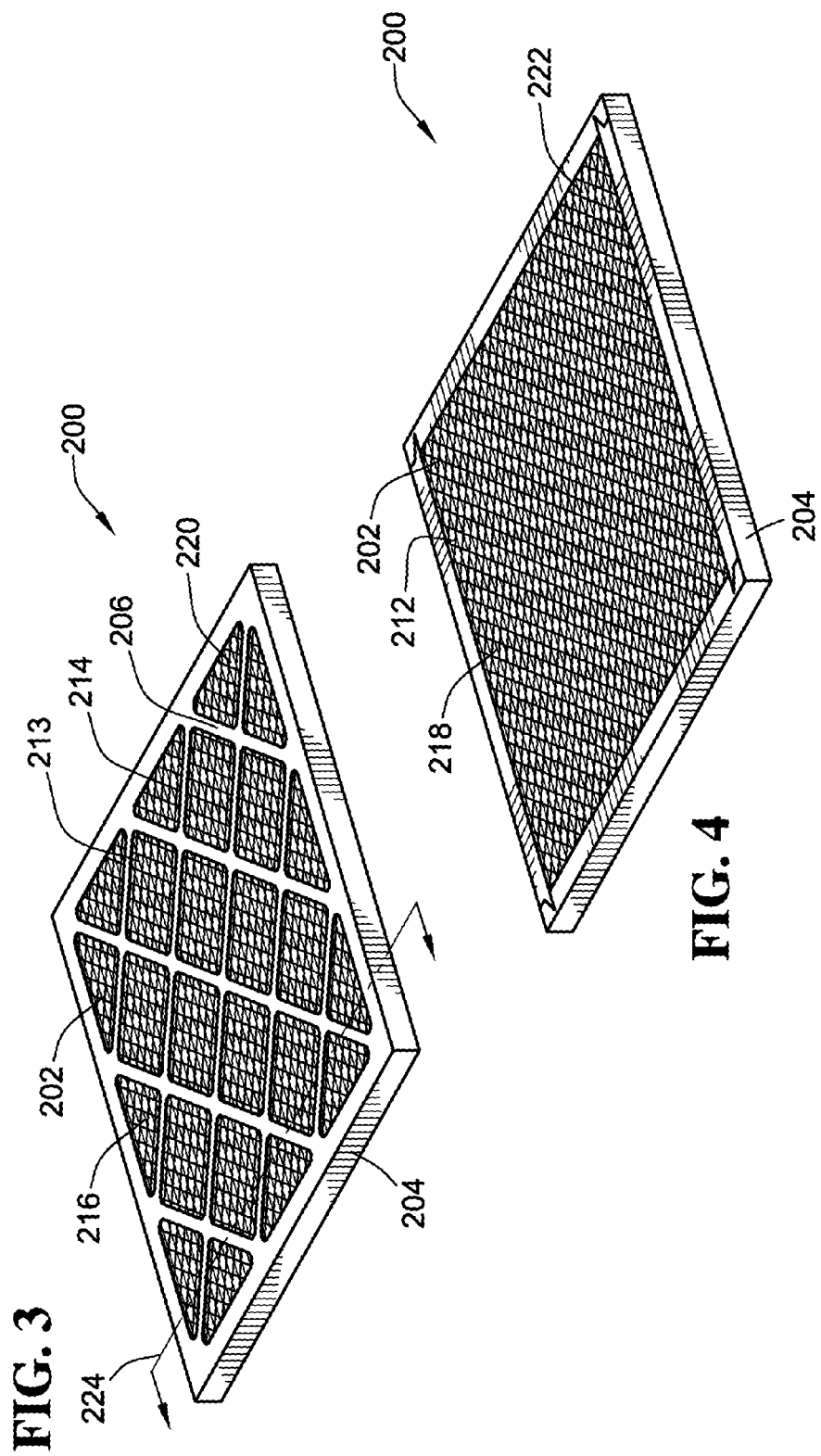

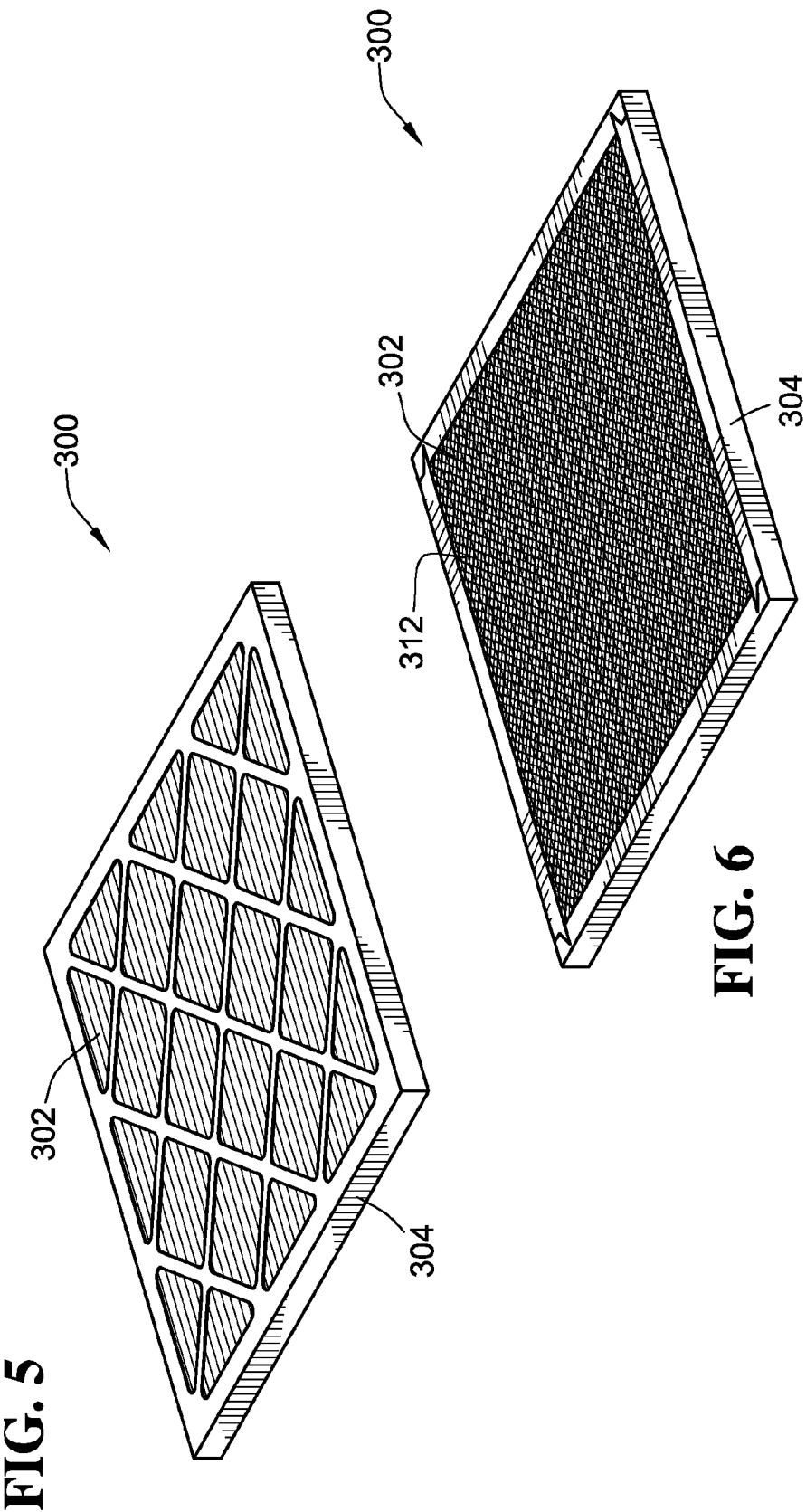

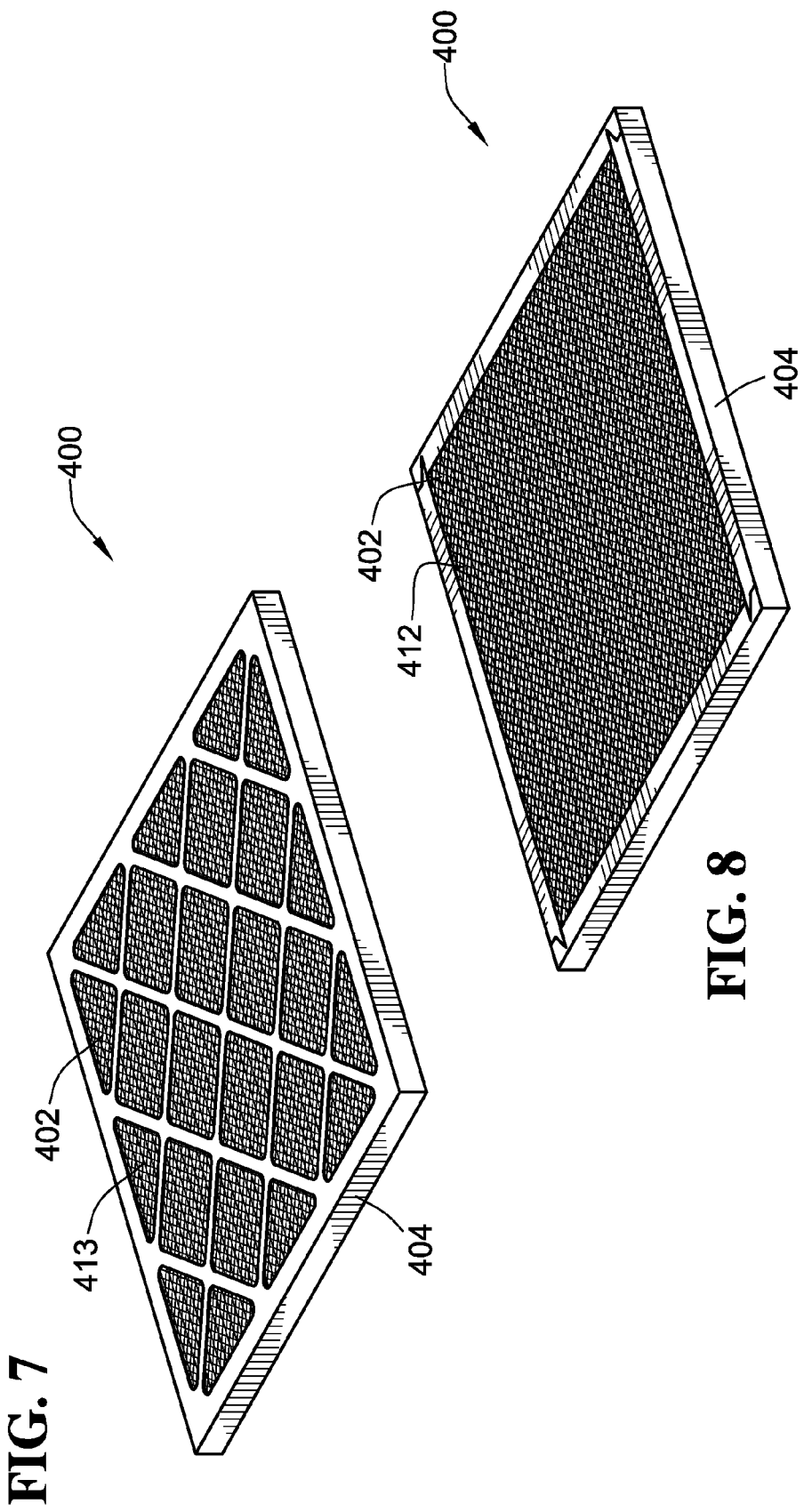

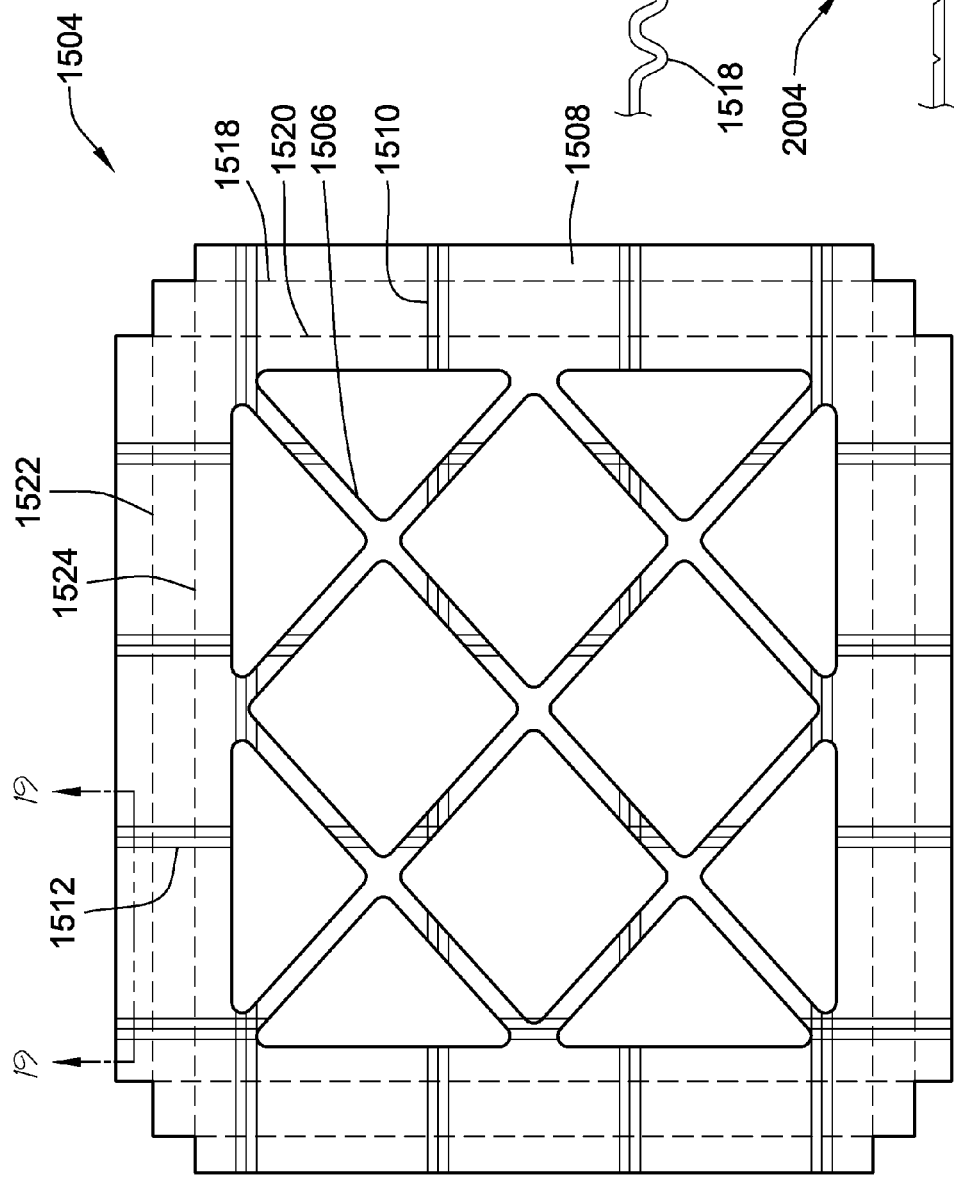
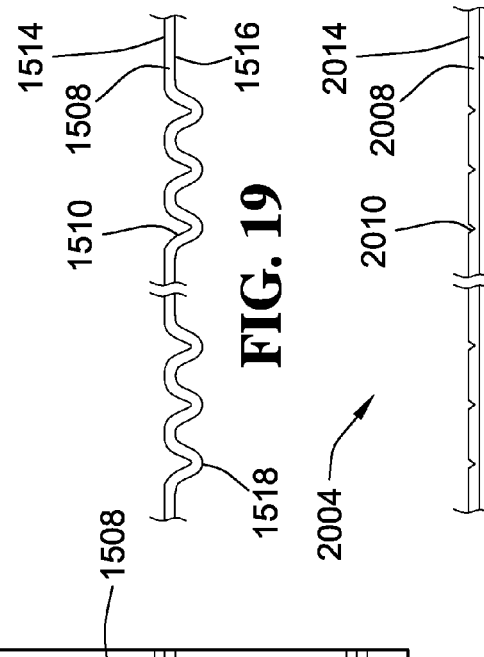
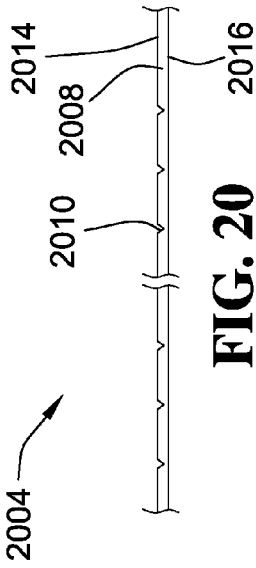
FIG. 15
FIG. 19
FIG. 20

PANEL FILTER

CROSS-REFERENCE TO RELATED PATENT APPLICATIONS

This patent application claims the benefit of U.S. Provisional Patent Application No. 61/173,478, filed Apr. 28, 2009, the entire teachings and disclosure of which are incorporated herein by reference thereto.

FIELD OF THE INVENTION

This invention generally relates to air filters, and more particularly to panel air filters.

BACKGROUND OF THE INVENTION

Panel air filters are generally used for filtering air in forced air systems such as furnaces and ventilation systems. Panel air filters generally comprise a panel of filter media surrounded and supported by a frame. One common type of filter media used in panel filters is pleated filter media that includes a plurality of peaks and valleys. Various prior art implementations are known to support pleated filter media so that the panel filters may withstand air pressure during operations. Such prior art includes Self-Supporting Pleated Panel Filter, U.S. Pat. No. 6,709,480 to Sundet et al.; Moisture Resistant Air Filter, U.S. Pat. No. 5,782,944 to Justice; and Panel Filter with Frame, U.S. Pat. Pub. No. 2007-0294988 assigned to the present assignee, the entire disclosures of which are incorporated herein by reference thereto.

BRIEF SUMMARY OF THE INVENTION

The present invention is directed to a panel filter that provides an improved support for a pleated filter media. For example, the pleated filter media in certain embodiments of this invention can be supported by a combination of integral webbing of a frame and one or more screens. Screens (e.g. metal screens) need not be co-pleated with the media, but bonded to pleat tips.

Preferably one generally planar support screen may be employed bonded to pleat tips across one side of the pleated media. When this is done and due to potential of expansion and/or contraction of the paper material in the paperboard frame (e.g. which has been found by the inventors to result from water absorption and drying such as from the glue and/or humidity variations), warping of the overall panel filter can result, which is undesirable as it is expected that retailers would prefer to sell and customers prefer to buy a generally flat filter element. Various means to prevent warping are disclosed that may be employed by themselves and/or in combination with one another to provide and maintain a generally flat panel filter. For example such means may include: applying a spring load to the screen (e.g. such as forming a bow into an expanded metal frame); using a low moisture and more viscous adhesive for frame attachment; a non-water based adhesive for frame attachment; forming extension joints into the paperboard material of the frame to accommodate expansion or contraction; preconditioning the paperboard material to reduce moisture content and impart irreversible and reversible shrinkage to the frame prior to assembly; and/or forming the frame such that the longer side of the frame is arranged parallel to the paperboard grain direction to minimize unwanted effects of distortion force.

It is a feature and a further inventive aspect that separate screens may not need to be employed on both sides of the media. It has been found that applying a bow shape to a metal screen such that the memory applies a spring force when folded flat in combination with a paperboard panel filter frame can counteract the tendency of the paper material to warp the frame, thereby resulting in a generally flat filter. Integral webbing in the paperboard frame may cover and be attached to pleat tips on the side opposite the metal screen.

Thus, a reduction in material inputs such as in the screening material can be achieved. However, it will be appreciated that further reinforcements may be added such as additional screens, but even these alternatives may benefit from warping prevention means.

According to another aspect, a filter apparatus comprises a pleated filter media supported by a screen and further supported by a one-piece die cut frame. The pleated filter media has two sides defined by a plurality of pleat tips. The screen is bonded to the pleat tips across one of the sides.

In another aspect, the invention provides a panel filter including a frame, a pleated filter media and a screen. The frame of this embodiment has a border and a webbing integrally formed with the frame. The pleated filter media defines two opposed sides by a plurality of pleat tips, wherein one of the sides is supported by the webbing bonded across the pleat tips of that side, and the other side is supported by the screen bonded across the pleat tips of that side.

In yet another aspect of the invention, a panel filter includes a pleated filter media defining two opposed sides by a plurality of pleat tips wherein one of the sides is supported by an integral webbing of frame and a screen. In this embodiment, the screen is bonded across the pleat tips on one of the sides, then the side with the screen is further bonded to the webbing such that the screen is bonded between the webbing and the pleat tips.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a perspective illustration of an upper side of a panel filter according to a first embodiment of the present invention;

FIG. 2 is a perspective illustration of a lower side of the panel filter of FIG. 1;

FIG. 3 is a perspective illustration of an upper side of a panel filter according to a second embodiment of the present invention;

FIG. 4 is a perspective illustration of a lower side of the panel filter of FIG. 3;

FIG. 5 is a perspective illustration of an upper side of a panel filter according to a third embodiment of the present invention;

FIG. 6 is a perspective illustration of a lower side of the panel filter of FIG. 5;

FIG. 7 is a perspective illustration of an upper side of a panel filter according to a fourth embodiment of the present invention;

FIG. 8 is a perspective illustration of a lower side of the panel filter of FIG. 7;

FIG. 15 is a plan view illustration of a frame including extension joints comprising a set of crease ribs according to an embodiment of the present invention;

FIG. 19 is a cross sectional view of the frame of FIG. 15 illustrating the extension joints comprising a set of creasing ribs; and FIG. 20 is a cross sectional view of a frame including extension joints comprising cut scores.

Figure 9:
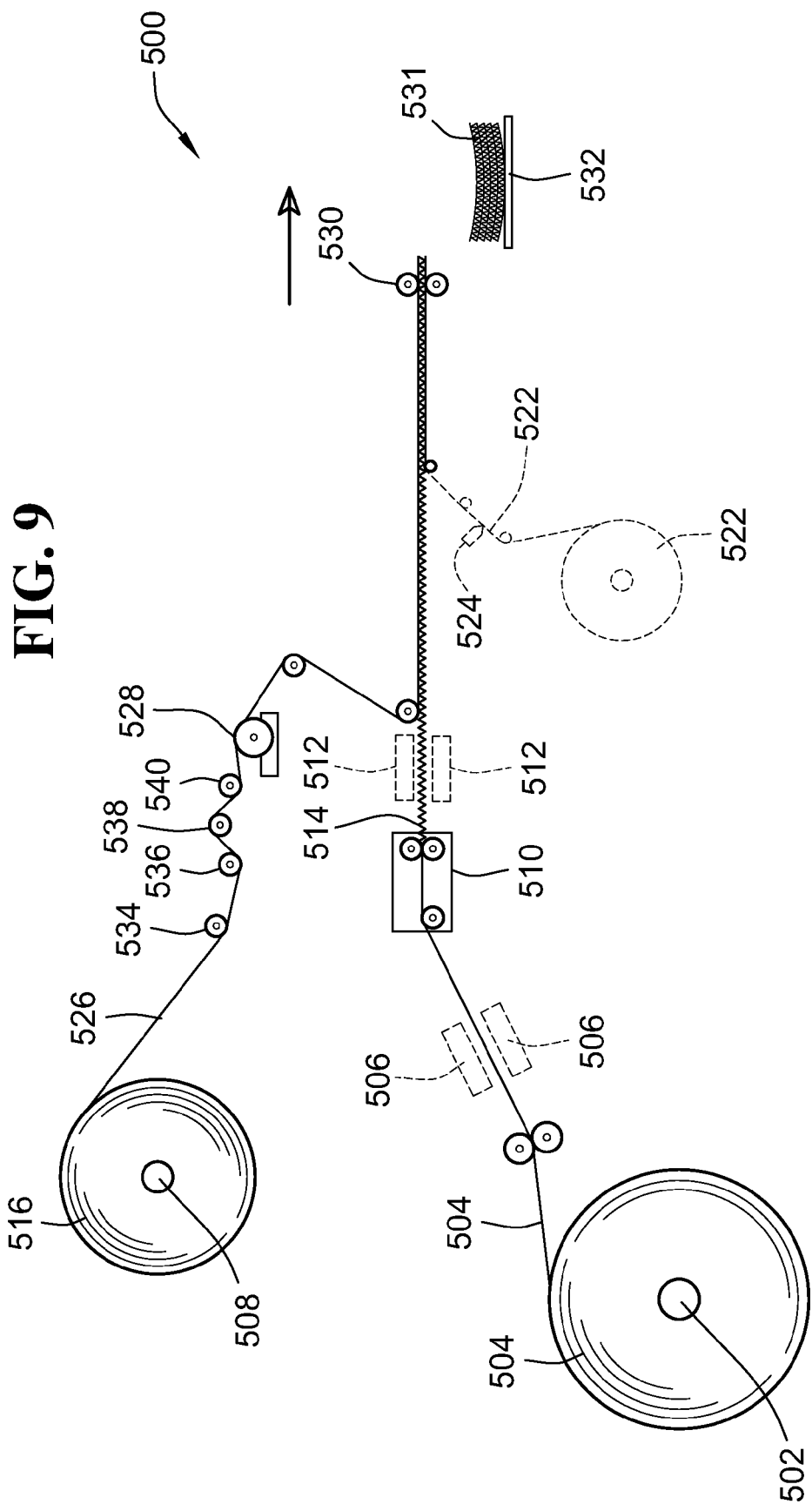
FIG. 9 is a schematic illustration of a system for performing a process of pleating a filter media and laminating a screen with the pleated filter media according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIGS. 1, 2 illustrate a first embodiment of panel filter 100 of the present invention. The first panel filter embodiment 100 will be explained in detail, while other embodiments illustrated in FIGS. 3-8 will be discussed and described in more limited detail highlighting differences and similarities relative to the panel filter 100. The method of making panel filter of the present inventions will also be discussed mostly in context of processes of making the panel filter 100 with brief discussions regarding modifications to the process for other embodiments.

The panel filter 100 includes a pleated filter media 102 supported by a frame 104 and a screen 112. Although, the panel filter 100, as shown in FIGS. 1, 2, is preferably square or rectangular in its shape, other shapes may also be possible. The pleated filter media 102 is typically formed from a relatively thin porous material that permits air to pass through but intercepts solid particles, such as dust, lint, and etc. For example, suitable HVAC panel filter media may comprise a polyester fiber media, cellulosic fiber media or bi-component media including polyethylene and polypropylene fibers carried on a support structure such as a polyester scrim, fiberglass scrim or cellulosic scrim. The filter material is folded into multiple pleats to provide sets of pleat tips 116, 118 on each side of the panel filter 100. Typically, pleats of the pleated filter media 102 are spaced such that there are 2-6 pleats per 1 inch, but the pleat spacing may be smaller or larger depending on different applications. For typical HVAC applications, the panel filter may be about 12-30 inches by about 12-30 inches, with a depth of 0.7-4.38 inches, preferably less than 1 inch.

In this embodiment, an upper side 120 of the pleated filter media 102 is supported and protected with an integral webbing 106 of the frame 104 as shown in FIG. 1, while a lower side 122 is supported and protected with the screen 112 as shown in FIG. 2. Although the screen 112 may be formed from various different materials, the screen 112 of the panel filter 100 is preferably made from a metal. For example, expanded metal mesh with various size and shape openings may be used as the screen 112. The openings of the screen are large enough such that the screen does not interfere with air flow or appreciably effect efficiency of air filtration while providing support across the lower side 122 of the pleated filter media 102 during operations. Alternatively, the screen 112 may be a plastic mesh screen, or other suitable support material.

To attach the screen 112 to the lower side 122 of the pleated filter media 102, the screen 112 is first applied with a suitable adhesive such as a hot melt adhesive, glue, etc. The adhesive coated screen 112 is then bonded to pleat tips 118 on the lower side 122. This can be by way of a roller coater so as to laminate an entire face of the screen. The adhesive is selected according to the surface characteristics the screen material and the filter material, such that the screen 112 is permanently bonded to the pleat tips 118. This maintains pleat spacing and also provides discrete support locations for the media.

The pleated filter media 102 supported with the screen 112 is further supported by the frame 104. The frame 104 includes the integral webbing 106, side walls 107, upper side flaps 108, and lower side flaps 110, integrally formed of a one-piece die-cut blank made from a paper (e.g. paper board, cardboard, paper composites, and other partial cellulose materials). Paperboard is often typical for such panel filter frame 104. Preferably, the paper frame material such as paperboard is clay coated on one side to provide a smooth surface for printing while enhancing moisture resistant characteristics which is advantageous to maintain a shape of panel filters when operating in a high moisture content environment; while the other side (e.g. the side facing the media) may be raw at least in the preassembled state (e.g. prior to roller coating with adhesive in some embodiments) so as to better facilitate adhesion with a suitable bonding agents. Such a one-piece die-cut frame is disclosed in U.S. Pat. Pub. No. 2007-0294988 assigned to the present assignee, the entire disclosure of which is incorporated herein by reference thereto.

The integral webbing 106 is formed when multiple holes 114 are cut out from the filter frame material during a frame die cutting process. The integral webbing 106 in FIG. 1 has generally diagonal shaped holes 114, with each hole providing an approximately 8-15 square inches area opening. However, the integral webbing 106 may be configured with openings in various shapes and sizes such that areas of the pleated filter media 102 covered by the integral webbing 106 are minimized to maximize efficiency of air filtration, while the integral webbing 106 is still providing enough support for the pleated filter media 102 to withstand air pressure applied across a surface of the panel filter 100 during operations.

The integral webbing 106 preferably has a different web configuration and hole size as compared to the metal screen 112 to provide a different type of and means of support. Thus, the support provided on the opposed sides is different and can be used to counteract deficiencies, if any, of the other and/or the strength carried more by one side.

The integral webbing 106 is also bonded to pleat tips 116 on an upper side 120 of the panel filter 100 by an a suitable adhesive such as a hot melt adhesive, glue, etc. For example, the adhesive can be applied by a roller coater across the entire raw paper board face of the frame, then bonded to the pleat tips 116. The upper side 120 may either be an upstream surface or a downstream surface of the panel filter 100. The adhesive is selected according to the surface characteristics of the frame material and the filter material, such that the integral webbing 106 is permanently bonded to the pleat tips 116.

As shown, the frame 104 is a one-piece die cut, meaning it is cut as a single piece from a sheet of paper board with punched out holes and score lines for facilitating folding. The integral webbing 106 is integrally connected to upper side flaps 108. The upper side flaps 108 are integrally connected to side walls 107 with first fold lines 109 between them. The side walls 107 are further integrally connected to lower side flaps 110 with second fold lines 111 between them. The upper side flaps 108, side walls 107, and lower side flaps 110 are coated with an adhesive and folded along the first and second fold lines 109, 111 around the peripheral edges of the pleated filter media 102 such that the peripheral areas of the pleated filter media 102 are enclosed by the upper side flaps 108, side walls 107, and lower side flaps 110.

The upper side flaps 108 are bonded to the pleat tips 116 in the peripheral areas of the pleated filter media 102 by the adhesive applied on the upper side flaps 108. The side walls 107 are folded along the first fold lines 109 such that the side walls 107 are bonded to the sides of the filter media 102 with the adhesive applied to the side walls 107. The lower side flaps 110 are folded along the second fold lines 111 such that the lower side flaps 110 are facing the lower side 122 of the pleated filter media 102. Once folded, the lower side flaps 110 are bonded to the screen 112 on the lower side 122 of the pleated filter media by the adhesive applied to the lower flaps 110. The upper side flaps 108 and lower side flaps 110 in FIGS. 1,2 are approximately 1 inch in width, however, the width of the upper side flaps 108 and the lower side flaps 110 may vary according to the size of the panel filter and support required in different applications.

Figure 11:
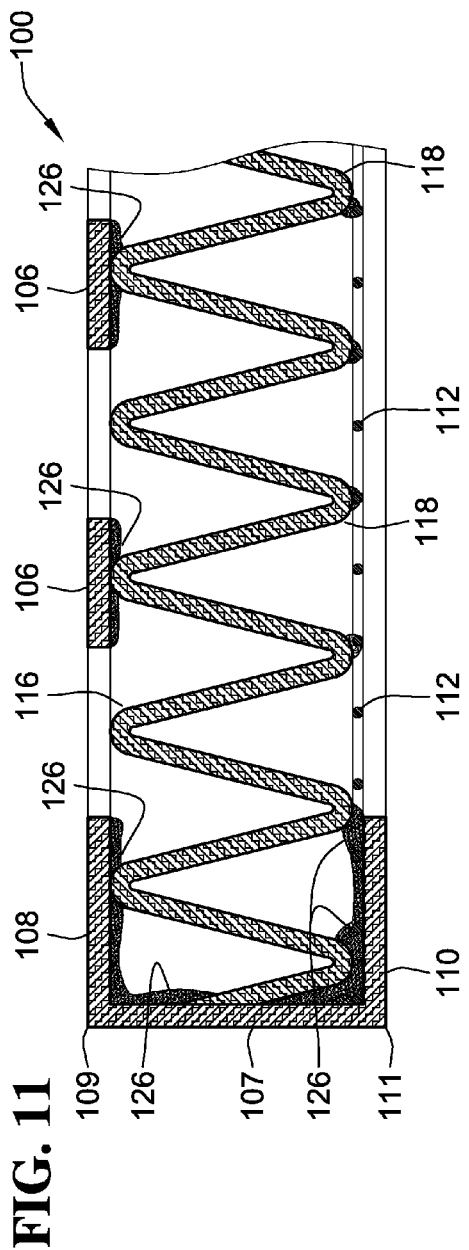
FIG. 11 is a cross sectional view of the panel filter in FIG. 1.
Figure 12:
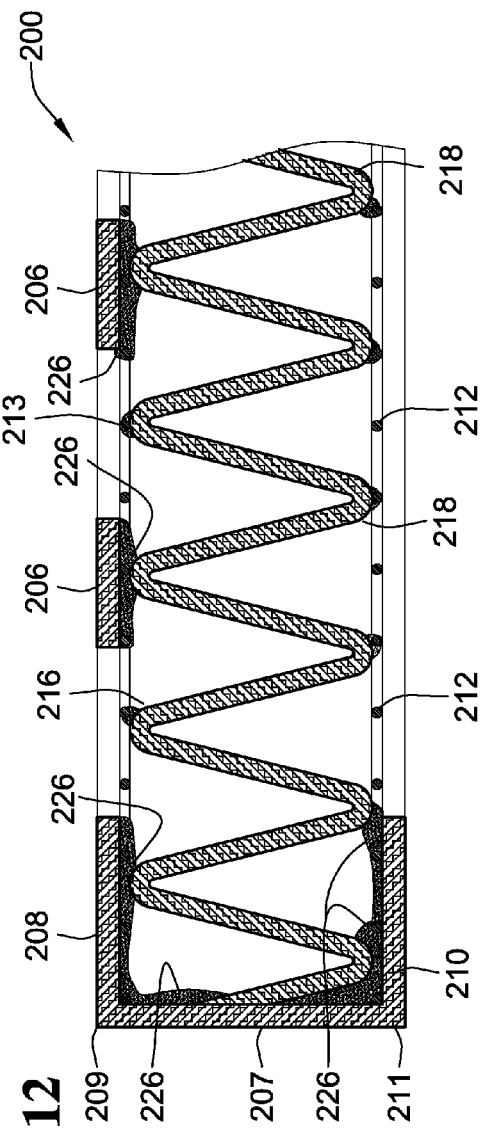
FIG. 12 is a cross sectional view of the panel filter in FIG. 3.

A cross sectional view of the panel filter 100, assembled as described above, is illustrated in FIG. 11. As discussed, upper side flaps 108, side walls 107, lower side flaps, 110, integral webbing 106 and screen 112 are bonded to pleat tips 116, 118 by adhesive 126.

Figure 16:
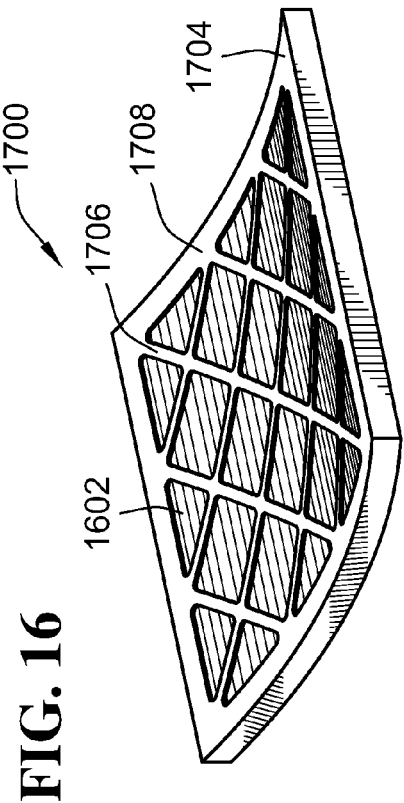
FIG. 16 is a perspective view illustrating bowing of a panel filter.

In an embodiment wherein the frame 104 formed of a paperboard is applied with an adhesive, moisture in the adhesive may transfer into the frame 104. A conventional polyvinyl acetate (PVA) may have about 55% solids and a viscosity of between 2100-2500 centipoise at 75° F. When such an adhesive is used, a moisture content of the board can increase up to 7-11% by moisture diffusion from the adhesive. The frame 104 with an increased moisture content relaxes, and may even stretch, as it is folded and bonded to form the panel filter 100. When the panel filter 100 is first assembled, it is generally flat. However, as the moisture in the frame 104 and adhesive dries, the frame 104 including the integral webbing 106 attached to one side of the filter media 102 may shrink and warp the panel filter 100. For example, the panel filter 100 may bow as the integral webbing 106 shrinks and form a camber with the integral webbing 106 on its concave surface as shown in FIG. 16. Such a warp or bowing of the panel filter 100 is not desirable as it is unappealing to customers and may be problematic in severe situations when installing in a HVAC system.

Therefore, various means may be used to prevent warping, including for example any of the following means in the alternative and/or in combination: applying a spring load to the screen (e.g. such as forming a bow into an expanded metal material); using a low moisture and more viscous adhesive for frame attachment; a non-water based adhesive for frame attachment; forming extension joints into the paperboard material of the frame to accommodate expansion or contraction; preconditioning the paperboard material to reduce moisture content and impart irreversible and reversible shrinkage to the frame prior to assembly; and/or forming the frame such that the longer side of the frame is arranged parallel to the paperboard grain direction to minimize unwanted effects of distortion force. These means to prevent warping may be also used to reduce material inputs if desired to reduce overall cost, such that a screen may only be provided on one of the faces (or possibly none of the faces). Of course, additional strength reinforcement may be selected as well for some embodiments using multiple screens. Various embodiments of warp prevention means are discussed below that may be used alternatively or in selective combination with each other. Further any of these means and/or combinations thereof are hereby disclosed as being utilized in any of the embodiments illustrated in FIGS. 1-20, inclusive.

In one embodiment, a suitable low moisture adhesive is used to bond the frame 104 to the filter media 102 to minimize or eliminate moisture transfer from the adhesive to the frame 104, thereby minimizing or eliminating the warping or bowing of the panel filter 100. The suitable low moisture adhesive has about 63%-75% solids and a viscosity between 1,500-55,000 centipoise at 75° F. An example of the suitable low moisture adhesive is ethylene vinyl acetate (EVA) adhesive having about 63% solids and a viscosity of about 1,700 centipoise at 75° F., which is commercially available through Wisdom Adhesive of Elgin Ill. under the trade designation R7020CS. Thus, some aspects of the present invention contemplate utilizing a low moisture adhesive having greater than about 60% solids content and a viscosity of greater than about 1,500 centipoise at 75° F.

Another example of the suitable low moisture adhesive is also available from Wisdom Adhesives under the trade designation W10XENN, which is EVA adhesive having about 71% solids and a viscosity of about 50,000 centipoise at 75° F. Yet another example of a low moisture adhesive is a pressure sensitive hot melt adhesive that does not include water or includes very low water content, and as such the application of the adhesive to the frame does not cause water absorption issues. Preferably, an adhesive circle having a diameter between 0.15"-0.4" is applied on the frame 104 about every 5"-15" using a holt melt gun. In one application, an adhesive circle having a diameter of about 0.25" is applied about every 10". Such a spot application of a low moisture adhesive can further reduce moisture transfer to the frame when compared to roll coating the entire surface of the frame with an adhesive.

In another embodiment, a frame is formed to include extension joints to counteract bowing or warping of a panel filter. FIGS. 15, 19, 20 show a frame including extension joints. FIG. 19 is a cross sectional view of a frame including extension joints formed of sets of creasing ribs, and FIG. 20 is a cross sectional view of a frame including extension joints formed of cut scores. The frame 1504, 2004 can be folded and bonded to a filter media to form a panel filter as discussed above with regard to panel filter 100. As it was with the frame 104, the frame 1504, 2004 includes an integral webbing 1506 and a plurality of foldable flaps 1508, 2008. The extension joints may comprise one or more crease ribs formed using a creasing die, or may comprise one or more cut scores formed using a scoring knife.

In one embodiment, as shown in FIG. 15, the frame 1504 includes extension joints comprising four sets of horizontal crease ribs 1510 and four sets of vertical crease ribs 1512. Each set includes three crease ribs, wherein each crease rib has about 1/16" crease depth and spaced about 1/4" apart, wherein each set of crease ribs are space about 3.5" apart. The crease ribs 1510, 1512 are formed by a creasing die pressing across an inner surface 1514 (the filter media facing surface) to form pressed lines/bumps 1518 on the frame 1504, as shown in FIG. 19. The pressed lines/bumps 1518 protrude on an outer surface 1516 of the frame and are visible from the outer surface 1516. The crease ribs 1510, 1512 extend across the plurality of foldable flaps 1508 and the integral webbing 1506, wherein the crease ribs 1510, 1512 cross fold lines 1520, 1518, 1522, 1524. The extension joints may comprise one crease rib or plurality of crease ribs. Preferably, a frame includes a set of 1-7 crease ribs per every 1"-6", more preferably a set of 3-5 crease ribs per every 3"-5". Each of the crease ribs may have a creasing depth between 1/64"-1/4", preferably between 1/32"-1/8".

Alternatively, the extension joints may be a cut score formed by a scoring knife. FIG. 20 shows one embodiment, wherein the frame 2004 includes extension joints comprising cut scores 2010. The cut scores are formed by a scoring knife cutting across an inner surface 2014 (the filter media facing surface), partially through the thickness of the frame material. The extension joints comprising cuts scores 2010 are not visible form the outer surface 2016 of the frame 2004. The cut scores extend across foldable flaps and an integral webbing of the frame 2004 and cross foldable lines, similar to the crease ribs 1510, 1512. A frame may include one cut score or plurality of cut scores. Preferably, a set of cut scores, each set including 1-3 cut scores, extending less than 1/2 of a thickness of the frame is formed every 1"-6". More preferably, one cut score, extending about 1/8-1/4 of a thickness of the frame is formed every 3"-5". The extension joints reduce or eliminate bowing or warping of a panel filter by accommodating the expansion and/or shrinkage in the frame by allowing for the expansion and/or contraction to be carried in the joint and/or acting as a hinge.

Figure 17:
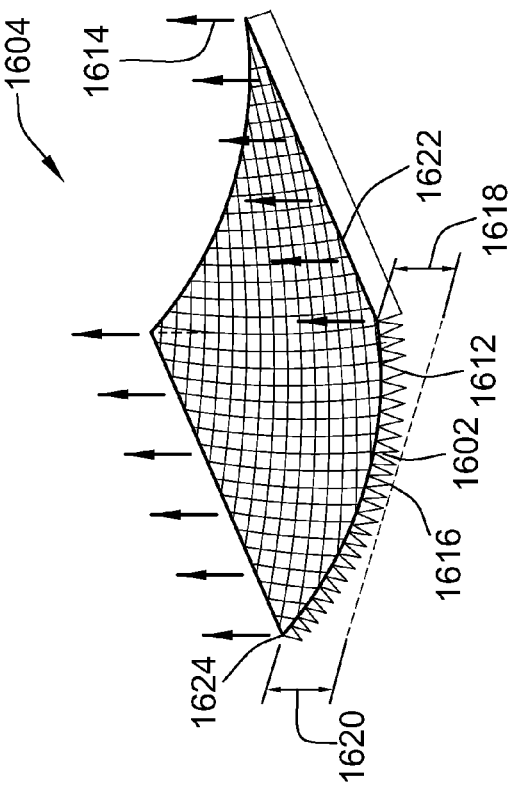
FIG. 17 is a perspective illustration of a rectangular filter media card including a metal screen having a spring force in a preassembled bowed state according to an embodiment of the present invention.
Figure 18:
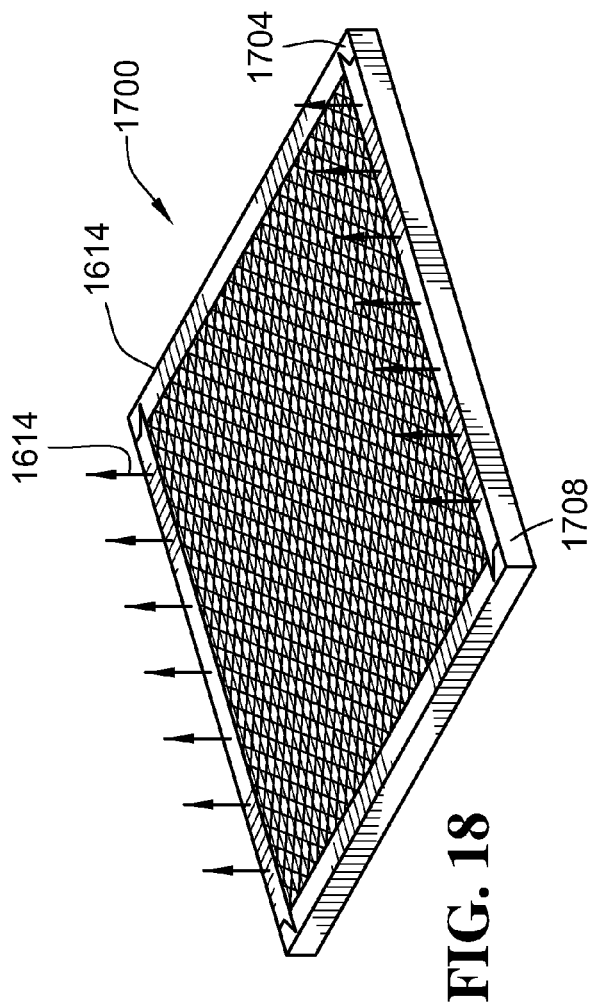
FIG. 18 is a perspective illustration of a panel filter including the rectangular filter media card of FIG. 17 in a generally flat state according to an embodiment of the present invention.

In another embodiment, the screen is loaded with a spring force when in the flat state. For example, in an embodiment, a metal screen having a spring force is used to counteract bowing or warping of a panel filter. In this embodiment, the metal screen has a preassembled bowed state with a bowed curvature that is adapted to counteract the warping that is expected to occur. Thus, while it may seem counterintuitive to form the metal screen into a non-flat state prior to assembly with the frame, the spring force generated thereby can be used to itself create a generally flat panel filter. FIGS. 17-18 show a panel filter 1700 including a metal screen 1612 having the spring force 1614 according to the embodiment. The panel filter 1700 is similarly constructed as the panel filter 100, and includes a pleated filter media 1602, a frame 1704 having an integral webbing 1706 and a border 1708, and a metal screen 1612. The frame 1704 is attached to the pleated filter media 1602 using a suitable adhesive. As discussed above, the panel filter 1700 may bow due to a shrinkage in the frame as shown in FIG. 16. To counteract this bowing, the metal screen 1612 is formed with a preset spring force 1614. As shown in FIG. 17, when the metal screen 1612 having the preset spring force 1614 is laminated to the pleated filter media 1602, and cut to form a rectangular filter media card 1610, the filter media card 1610 is in a bowed state with a bowed curvature. An amount of bow is adjusted to counteract the amount of the bow in the panel filter 1700. The amount of bow in the filter media card 1610 can be measured as a preset 1618, 1620 which is a vertical distance between a vertex 1616 and a first cut end 1622 or a vertical distance between the vertex 1616 and a second cut end 1624. Preferably, the filter media card 1620 has a preset between 1-4 times a thickness of a pleat depth, and more preferably, 1-3 times a thickness of a pleat depth. For example, a filter media card including a 1" pleat depth pleated filter media can be formed to have a preset between 1"-3" depending on a size of a panel filter. When the filter media card 1610 is mounted in the frame 1704, the filter media card 1610 applies the spring force 1614 against the shrinkage in the frame 1704. As such, the panel filter 1700 stays in a generally flat state as shown in FIG. 18.

In one embodiment, the frame 104 is preconditioned to minimize post assembly shrinkage and distortion of panel filter 100. Cellulosic material such as a paperboard for the frame 104 can include internal stress from manufacturing process and drying in a constrained state of a roll form. Such internal stress can be relieved by cyclic changing of the moisture content of the paperboard material after the constraining state has been removed. For example, after a roll of paperboard material is printed and/or sheeted, and die cut to a frame 104, the frame 104 can be pretreated to reduce the moisture content of the paperboard material. In one embodiment, the frame 104 is kiln dried to reduce the moisture content from about 7-11% to below 6%. Such reduction of the moisture content may shrink the paperboard material, wherein some of the shrinkage is irreversible and resulting in a permanent shrinkage of the paperboard material. The preconditioned frame 104 is less prone to further shrinkage when subjected to moisture and/or heat. Therefore, the preconditioning process can minimize shrinkage or deformation of frame 104 during and after assembly the panel filter 100, reducing the propensity of the unwanted warping.

Before turning to alternative embodiments of the panel filter in the present invention, a representative process of making the panel filter 100 will now be explained. FIG. 9 is a schematic illustration of a system 500 for performing a process of pleating the filter media 102 and laminating the screen 112 to the pleated filter media 102. System 500 includes a roller 502 which holds and continuously feeds a roll of filter media 504, which is pre-slit to a desired width. The filter media 504 may optionally be preheated at a heating station 506, which may be an infrared heater, to facilitate pleating process. The filter media 504 is pleated in a pleat folding station 510. A set of heaters 512, typically an infrared heater, may be provided for heating the pleated filter media 514 to facilitate setting of pleats.

System 500 also includes a roller 508 which holds and continuously feeds a roll of screen 516. Prior to being laminated with the pleated filter media 514, the screen 526 is applied with an adhesive at an adhesive station 528. The adhesive applied screen 526 is then laminated to the filter media 514, such that the screen 526 is bonded to the pleat tips of the pleated filter media 514. Once laminated, the screen 526 can maintain the pleat spacing while providing dimensional stability of the pleats. The screen 526 may be made of various materials such as a metal or plastic.

In one embodiment, the screen 526 is a metal screen, such that one side of a pleated filter media is supported by the metal screen and the other side is supported by an integral webbing of a frame as described above with regard to panel filter 100. In such an embodiment, the screen 526 can be bowed to provide a metal screen having a spring force to counteract the bowing of a panel filter, as discussed at length above. Bowing of the metal screen 526 is provided when the metal screen 526 passes through a set of tension rollers 536, 538, 540. As shown in FIG. 9, the roll of metal screen 516 is unwound from a the roller 508 and guided by a guiding roller 534 to the set of three tension rollers 536, 538, 540, wherein a predetermined tension is applied to set a reverse bow into the metal screen 526. The amount tension can be controlled by adjusting the tension rollers 536, 538, 540. The tension applied metal screen 526 is then coated with an adhesive in the adhesive station 528 before being laminated to the pleated filter media 514.

In some embodiments, a second screen 522 is laminated on the lower side of the pleated filter media 514 after being applied with an adhesive at an adhesive station 524. As it was with the screen 526, the adhesive applied screen 522 bonds to pleat tips of the pleated filter media 514. The screen 522 may be made of various materials such as a metal or a plastic.

The pleated filter media 514, laminated with the screen 526 and/or with screen 522 is then cut at a cutting station 530 into a desired length producing rectangular filter media cards 531. The filter media cards 531 can be immediately processed with frames or more preferably can be accumulated such as stacked on a pallet 532 and transported to an assembly station 600 (see FIG. 10). In embodiments including metal screen bowing process, the filter media card 531 is in a preassembled bowed state with a bowed curvature as shown in FIG. 17. In the bowed state, the filter media card 1610 has a convex surface and a concave surface, wherein the metal screen is arranged in the concave surface.

Figure 10:
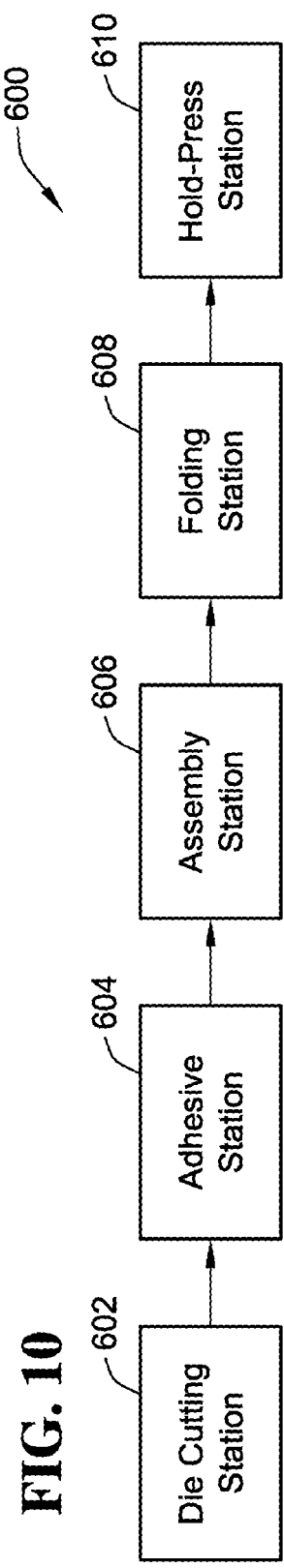
FIG. 10 is a schematic illustration of a system for performing a process of forming a frame and assembling panel filter according to an embodiment of the present invention.

In sequence with system 500, system 600 is provided for performing a process of making the frames 104 and assembling the frames 104 with the filter media card 531. FIG. 10 is a schematic illustration of system 600. System 600, as shown in FIG. 10, includes a die cutting station 602, an adhesive station 604, an assembling station 606, a folding station 608, and an optional hold-press station 610.

In system 600, a suitable frame material such as paperboard may be supplied as a continuous stock or cut to length sheets. The frame material is fed to the die cutting station 602. In the die cutting station 602, holes 114 are cut out and lines are scored to the frame material to form the integral webbing 106 and the first and second fold lines 109, 111 (FIGS. 1, 10). Further, when the frame material is fed to the die cutting station 602 in the form of a continuous stock, the die cut and scored frame material will be cut to a desired length to produce the frame 104. In the embodiments, wherein a frame includes extension joints, a die for punching integral webbing holes can be designed to include a set of creasing edges for forming a set of creasing ribs or a set of scoring knifes for forming cut scores in the frame. The die cutting station 602 may be onsite or at a separate manufacturing location such as at a paper manufacturer who supplies die cut frames in stacks.

In one embodiment, the paperboard is die cut such that a longer side of the frame 104 is parallel with the paperboard grain direction to minimize post distortion of the panel filter 100. During paperboard manufacturing process, fibers line up in a machine direction as the paperboard is formed. As such, the paperboard has a corresponding grain direction. When the paperboard is subjected to moisture and/or heat, a shrinkage in the cross-grain direction can be greater than the grain direction. In one embodiment, the shrinkage in the cross-grain direction is three to six times that of the grain direction. With this finding, the frame 104 having a rectangular shape is formed such that the paperboard grain direction is parallel with the longer side of the frame 104. The such arrangement of the frame 104 can reduce a total shrinkage of the frame 104. The effect of the higher cross-grain shrinkage rate is minimized by orienting the die cut cross-grain with the smaller face dimension of the frame 104. For example, a 20"×30" paperboard frame with the grain direction parallel to 20" side can have 0.219" shrinkage along the cross-grain direction (i.e. 30" side) and 0.041" shrinkage along the grain direction (i.e. 20" side), resulting in 0.260" total shrinkage when exposed to moisture/heat. Under the same moisture/heat exposure, the total shrinkage can be reduced by arranging the grain direction parallel to the longer sides. When the frame is die cut such that the grain direction is parallel to the 30" side, the cross-grain direction (i.e. 20" side) can have 0.146" shrinkage and the grain direction (i.e. 30" side) can have 0.0615" shrinkage, resulting in 0.201" total shrinkage. As such, the arrangement of the grain direction parallel to the longer side of the frame is preferred to minimize the total shrinkage of the paperboard frame.

The filter media card 531 may be mounted in the frame 104 such that pleats or pleat tips of the pleated filter media 102 are parallel to the longer sides, or alternatively, parallel to the shorter sides of the frame 104 having a rectangular shape. In one embodiment, the filter media card 531 is assembled in a paperboard frame having a rectangular shape with the pleats oriented parallel to the shorter sides of the frame and the cross-grain direction of the die cut paperboard frame. This provides more columnar structural strength to retard the stronger cross-grain compression forces.

The frame 104 is transferred to the adhesive station 604. In the adhesive station 604, the frame 104 is coated with a suitable adhesive. For example, the adhesive may be applied by a roller coater across a frame surface, or spray coated. Alternatively, the adhesive could be applied manually by an operator, using an adhesive application device such as an adhesive gun. In one embodiment, a thin layer of a low moisture adhesive such as an EVA adhesive having 68-74% solids and a viscosity between 47,000-52,000 centipoise at 75° F. is applied via a roll coater on the inner surface of a frame. In a different embodiment, drops of a hot melt EVA adhesive having a viscosity between 1,400-2,300 centipoise at 375° F. is applied using a hot melt gun. For example, adhesive circles, each having a diameter of about 0.25" and about 10" apart, are applied on the inner surface of the frame.

The adhesive applied frame 104 is transferred to the assembly station 606 wherein the frame 104 and the filter media card 531 are laminated together. In assembly station 608, the filter media card 531 is centered on the frame 104. When the filter media card 531 is formed for the panel filter 100, the filter media card 531 is placed on the frame 104 such that the upper side 120 which is without the metal screen 112 is facing the frame surface with the adhesive, thereby bonding the integral webbing 106 to the pleat tips 116 of the pleated filter media 102 (FIG. 1). In an embodiment including a metal screen having a spring force, a filter media card in a preassembled bowed state is placed on the adhesive applied frame, such that a convex surface having a pleated filter media is placed on the adhesive coated inner surface of the frame. When the frame is folded and bonded to the filter media card, the pleat tips on the convex surface of the filter media card is bonded to the integral webbing of the frame.

Next, the laminated filter media card 513 and the frame 104 are transported to the folding station 608. In the folding station 608, the frame 104 is folded along the first fold lines 109, then again along the second fold lines 111 such that the peripheral edges of the pleated filter media 102 (or the filter media cards 531) are enclosed by the side flaps 108, 110, and the side walls 107 of the frame 104. Wherein a metal screen having a spring force is used, the integral webbing bonded to the pleat tips counteract the bowing in the filter media card.

During the frame assembly process, a slight pressure is applied across the integral webbing side of the penal filter, temporarily flattening the penal filter to provide a good contact and bonding between the integral webbing and the pleat tips. However, the penal filter may bow slightly toward the metal screen side due to the spring force applied by the metal screen after the pressure is released from the panel filter surface. However, as moisture in the frame and adhesive dries, the frame may shrink and bow the panel filter toward the integral webbing side, wherein the metal screen applies the spring force to cancel out the shrinkage bowing to maintain the panel filter in a generally a flat state.

If desired, the assembled panel filters may be further transported to the hold-press station 610 wherein pressing and holding of panel filters (e.g. between two parallel conveyors or jacketing or other pressure applying devices) may be performed to ensure better adhesion between the pleated filter media 102 and the frame 104 and/or to promote the planar shape of panel filters. In some embodiments, the station 610 may not be necessary. However, such a station 610 may advantageously better maintain a planar shape and/or counteract bowing material if experienced.

Now turning back to alternate embodiments of the present invention, FIGS. 3, 4 illustrate a second embodiment. A panel filter 200 is similar to the panel filter 100 in that the panel filter 200 also includes a pleated filter media 202 supported by a frame 204. However, where the panel filter 100 is supported by the metal screen 112 only on the lower side 122, the panel filter 200 is supported by metal screens 212, 213 on both sides of the pleated filter media 202.

As described above, the metal screens 212, 213 are laminated to the pleated filter media 202 using system 500 of FIG. 9. The additional metal screen 213 provides extra support for the pleated filter media 202. The frame forming and assembly process of FIG. 10, previously described, remains largely the same, but since the pleated filter media 202 of the second embodiment is supported with the metal screens 212, 213 on both sides, either upper side 220 or lower side 222 of the pleated filter media 202 may be bonded to the integral webbing 206 of the frame 204. Therefore, another obvious difference between the first embodiment and the second embodiment is that the panel filter 200 has an extra layer, namely metal screen 213 between the pleat tips 216 of the upper side 220 and the integral webbing 206, wherein the pleat tips 216 are adhesively bonded to the metal screen 213 which is then adhesively bonded to the integral webbing 206.

A cross sectional view of the panel filter 200, assembled as described above, is illustrated in FIG. 12.

FIGS. 5, 6 illustrate a third embodiment of the present invention. A panel filter 300 of the third embodiment is similar to the panel filter 100 of the first embodiment in that the panel filter 300 also includes a pleated filter media 302 supported by a frame 304 and a screen 312. The only difference between the panel filter 100 and the panel filter 302 is that the screen 312 is formed of a plastic material rather than the metal of the screen 102.

FIGS. 7, 8 illustrate a fourth embodiment of the present invention. A panel filter 400 of the fourth embodiment is similar to the panel filter 200 of the second embodiment in that the panel filter 400 also includes a pleated filter media 402 supported by a frame 404 and screens 412, 413 on both sides of a pleated filter media 402. Again, the only difference between the panel filter 200 and the panel filter 400 is that the screens 412, 413 are formed of a plastic material rather than the metal of the screen 412, 413.

Figure 14:
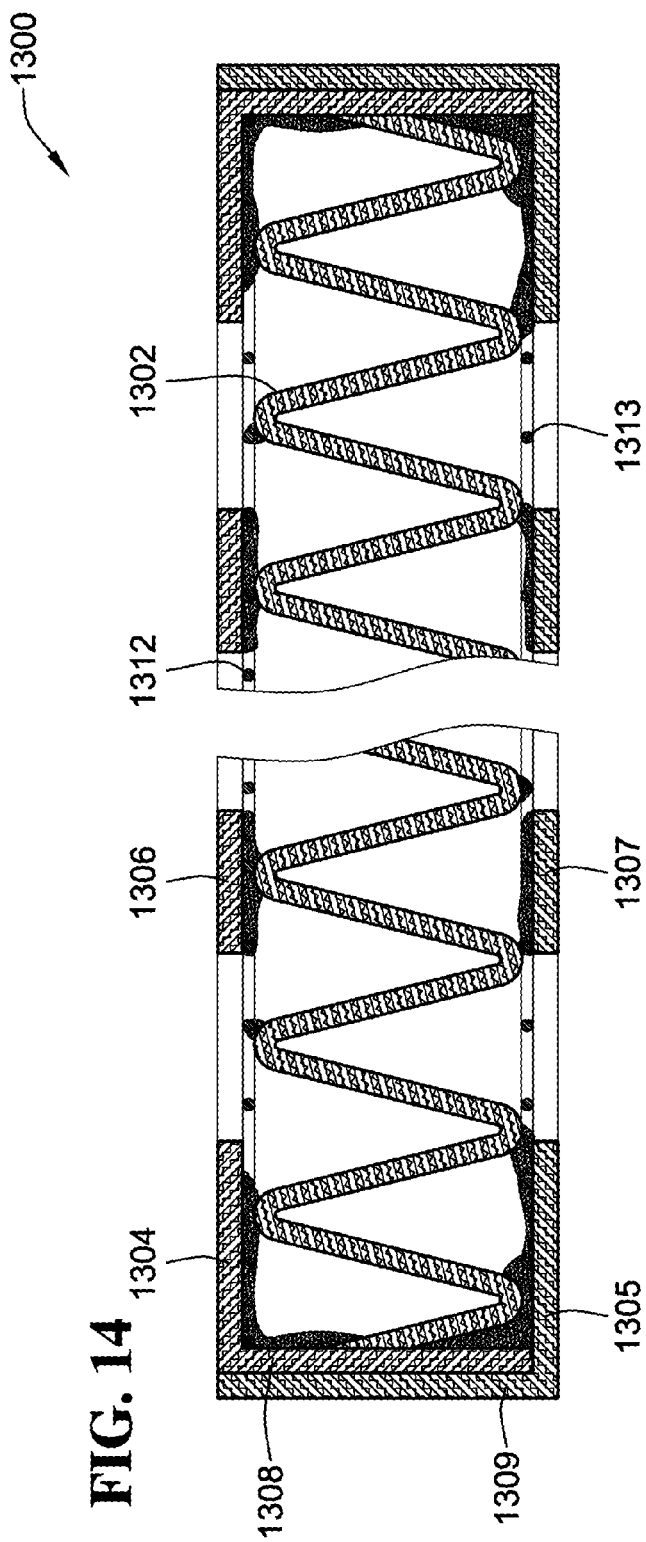
FIG. 14 is a cross sectional view of the panel filter in FIG. 13.
Figure 13:
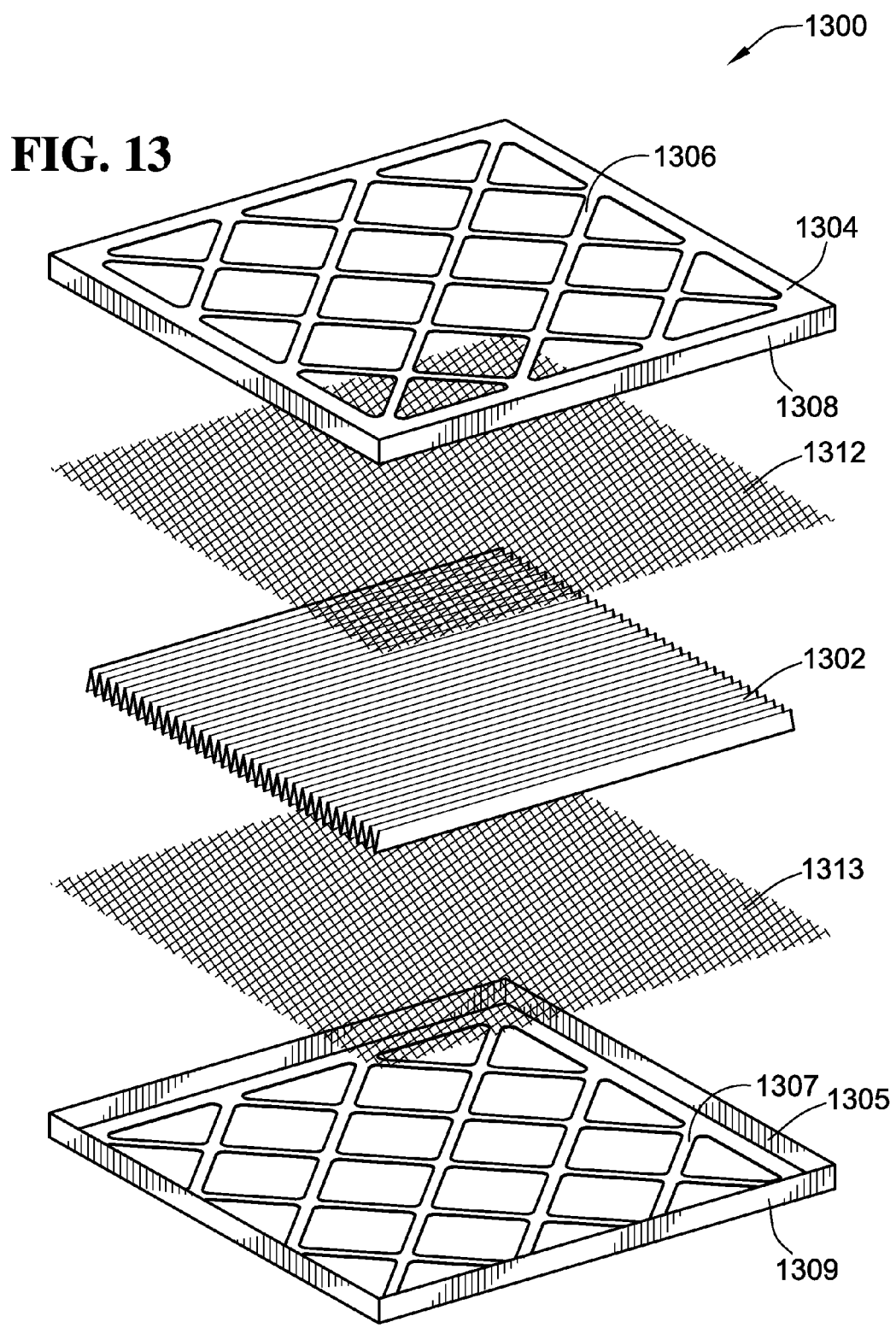
FIG. 13 is an exploded perspective view of a panel filter according to a fifth embodiment of the present invention.

FIGS. 13, 14 illustrate a fifth embodiment of the present invention. A panel filter 1300 includes a pleated filter media 1302, frames 1304, 1305 and screens 1312, 1313. The panel filter 1300 is similar with the panel filter 200 and 400 in that the panel filter 1300 is supported with the screens 1312, 1313 on both sides of the pleated filter media 1302. The screens 1312, 1313 may be metal screens as it was with the panel filter 200 or plastic screens similar to the panel filter 400.

The pleated filter media 1302 is further supported by an upper frame 1304 and a lower frame 1305. Each of the frames 1304, 1305 is similar to the frame of other embodiments, including integral webbings 1306, 1307 and side walls 1308, 1309, but it does not include lower side flap 110 (see FIGS. 1-8 and 13). Thus, in this embodiment, both sides of the pleated filter media 1302 are supported by the screens 1312, 1313 and the frames 1304, 1305 having the integral webbings 1306, 1307. Specifically, each screen 1312, 1313 is laminated with adhesive and bonded to pleat tips on opposed sides, respectively; and the other side of each screen is bonded to the integral webbing of the respective die cut frame by adhesive (typically this is accomplished by applying adhesive to the die cut frame).

The panel filter 1300 is illustrated in an exploded view in FIG. 13 and a partial cross-sectional view in FIG. 14. The pleated filter media 1302 is bonded to the screens 1312, 1313 then to the integral webbings 1306, 1307 with adhesives 1326 as it was with other embodiments. As shown, the upper frame 1304 and the lower frame 1305 are assembled such that the side wall 1309 of the lower frame 1305 overlaps the side wall 1308 of the upper frame 1304. However, in other embodiments, the side wall 1308 of the upper frame 1304 may overlap the side wall 1309 of the lower frame 1305. In yet different embodiment, the panel filter 1300 may only include one screen 1312, thus one side of the pleated filter media 1302 is supported by both the screen 1312 and the integral webbing 1306, while the other side of the pleated filter media 1302 is only supported by the integral webbing 1307. The screen 1312 of this embodiment can be formed of any suitable material as discussed with previous embodiments; preferably, the screen 1312 is a metal screen.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a panel filter having a metal screen only on one side, comprising:
   pleating filter media to form a pleated filter media having pleat tips on opposed sides;
   applying a load to a metal screen to provide a spring force;
   bonding the metal screen to the pleat tips on one of the opposed sides of the pleated filter media;
   cutting the metal screen and the pleated filter media to form a rectangular filter media card having a segment of pleated filter media with a segment of the metal screen on only one side, the filter media card having a first cut end and a second cut end, wherein the spring force in the metal screen forms the rectangular filter media card into an arcuate shape; and
   jacketing the rectangular filter media card in a panel frame, thereby forming the panel filter having a metal screen only on one side.

2. The method of claim 1, wherein applying a tension includes running the metal screen through at least three tension rollers, wherein an amount of the spring force in the metal screen is adjusted by controlling a tension applied by the at least three-tension rollers.

3. The method of claim 1, wherein the bonding includes applying an adhesive on the metal screen and laminating the metal screen on the pleat tips such that when the metal screen and the pleated filter media are cut to form the filter media card, the metal screen in arranged in a concave surface of the filter media card.

4. The method of claim 3, wherein the spring force in the metal screen forms the rectangular filter media card into the arcuate shape, wherein the metal screen is inside the arcuate shape and a vertex is on a convex surface of the filter media side, the rectangular filter media card having a preset range between 1-3 times a thickness of a pleat depth of the pleated filter media, wherein the preset is a vertical distance between the first cut end and the vertex or a vertical distance between the second cut end and the vertex.

5. The method of claim 4, wherein the pleated filter media has a pleat depth of about 1" and the rectangular filter media card has a preset range between 1.5" to 2.5".

6. The method of claim 1, wherein jacketing includes forming the panel frame including an integral webbing from a paper material, placing the filter media card in the panel frame and bonding the integral webbing across pleat tips on the side not supported by the metal screen.

7. The method of claim 6, wherein the panel frame is a one-piece die cut frame including a plurality of foldable flaps, wherein the plurality of foldable flaps are bonded to edges of the filter media card, wherein the plurality of foldable flaps encloses a periphery of the pleated filter media card, wherein the integral webbing and the plurality of foldable flaps are bonded to the filter media card with a low moisture adhesive.

8. The method of claim 7, wherein the panel frame is roll coated with a low moisture EVA adhesive having about 68-74% solids and a viscosity between 47,000-52,000 centipoise at 75° F.

9. The method of claim 7, wherein the panel frame is bonded to the filter media card using a pressure sensitive EVA hot melt adhesive having a viscosity between 1,400-2,300 centipoise at 375° F., wherein the adhesive is applied with a hot melt gun, the hot melt gun applying an adhesive circle about 10" apart, the adhesive circle having a diameter about 0.25".

10. The method of claim 1, wherein jacketing includes die cutting the panel frame including extension joints.

11. The method of claim 1, wherein the jacketing includes die cutting the panel frame from a paperboard material and preconditioning the panel frame by drying the panel frame to a moisture content less than about 6%.

12. The method of claim 1, wherein the jacketing includes die cutting the panel frame from a paperboard material having a grain direction, wherein the panel frame has a rectangular shape including a first side, a second side, a third side, and a fourth side, wherein the first side and the second side are parallel to each other, and the third side and the fourth side are parallel to each other, wherein each of the first and second sides are longer in length than each of the third and fourth sides, wherein the first and second sides are parallel to the grain direction.

13. A method of forming a panel filter having a metal screen only on one side, comprising:
   pleating filter media to form a pleated filter media having pleat tips on opposed sides;
   bonding a metal screen to the pleat tips on one of the opposed sides of the pleated filter media;
   jacketing the pleated filter media in a panel frame, thereby forming the panel filter having a metal screen only on one side; and cutting the metal screen and the pleated filter media to form a rectangular filter media card having a segment of pleated filter media with a segment of the metal screen on only one side, the filter media card having a first cut end and a second cut end, wherein a spring force in the metal screen forms the rectangular filter media card into an arcuate shape, and wherein the panel frame counteracts the spring force and flattens the rectangular filter media card when jacketed.

14. The method of claim 13, wherein the metal screen is unwound from a roll and as such has memory tending to cause an arcuate shape, further comprising controlling the amount of memory so that when the rectangular filter media card is jacketed the panel filter has a generally flat state.

15. The method of claim 14, further comprising running the metal screen through tension rollers, wherein an amount of the spring force in the metal screen is adjusted by controlling a tension applied by the tension rollers.

16. The method of claim 13, wherein the bonding includes applying an adhesive on the metal screen and laminating the metal screen on the pleat tips such that when the metal screen and the pleated filter media are cut to form the filter media card, the metal screen is arranged in a concave surface of the filter media card.

17. The method of claim 13, wherein the spring force in the metal screen forms the rectangular filter media card into the arcuate shape, wherein the metal screen is inside the arcuate shape and a vertex is on a convex surface of the filter media side, the rectangular filter media card having a preset range between 1-3 times a thickness of a pleat depth of the pleated filter media, wherein the preset is a vertical distance between the first cut end and the vertex or a vertical distance between the second cut end and the vertex.

18. The method of claim 13, wherein the pleated filter media has a pleat depth of about 1" and the rectangular filter media card has a preset range between 1.5" to 2.5".

19. The method of claim 13, wherein jacketing includes forming the panel frame including an integral webbing from a paper material, placing the filter media card in the panel frame and bonding the integral webbing across pleat tips on the side not supported by the metal screen.

20. The method of claim 19, wherein the panel frame is a one-piece die cut frame including a plurality of foldable flaps, wherein the plurality of foldable flaps are bonded to edges of the filter media card, wherein the plurality of foldable flaps encloses a periphery of the pleated filter media card, wherein the integral webbing and the plurality of foldable flaps are bonded to the filter media card with a low moisture adhesive.

21. The method of claim 20, wherein the panel frame is roll coated with a low moisture EVA adhesive having about 68-74% solids and a viscosity between 47,000-52,000 centipoise at 75° F.

22. The method of claim 20, wherein the panel frame is bonded to the filter media card using a pressure sensitive EVA hot melt adhesive having a viscosity between 1,400-2,300 centipoise at 375° F., wherein the adhesive is applied with a hot melt gun, the hot melt gun applying an adhesive circle about 10" apart, the adhesive circle having a diameter about 0.25".

23. A method of forming a panel filter having a metal screen only on one side, comprising:
  pleating filter media to form a pleated filter media having pleat tips on opposed sides;
  bonding a metal screen to the pleat tips on one of the opposed sides of the pleated filter media;
  jacketing the pleated filter media in a panel frame, thereby forming the panel filter having a metal screen only on one side; and wherein the metal screen when bonded the to the pleated filter media forms a rectangular filter media card in which the metal screen bows the filter media into an arcuate shape, and wherein said jacketing flattens the arcuate shape into a generally flat state.

24. The method of claim 23, wherein the panel frame includes integral webbing and bonding the integral webbing to the pleat tips on one of the opposed side of the pleated filter media in opposition to the metal screen.

25. The method of claim 24, further comprising controlling the moisture in the integral webbing to limit the amount of expansion or contraction of the integral webbing to thereby achieve the generally flat state.

26. A method of forming a panel filter having a metal screen only on one side, comprising:
  filter media to form a pleated filter media having pleat tips on opposed sides;
  bonding a metal screen to the pleat tips on one of the opposed sides of the pleated filter media;
  jacketing the pleated filter media in a panel frame, thereby forming the panel filter having a metal screen only on one side; and wherein the jacketing includes die cutting the panel frame from a paperboard material and preconditioning the panel frame by drying the panel frame to a reduced moisture content.

27. The method of claim 26, wherein the the panel frame is die cut from a paperboard material having a grain direction, wherein the panel frame has a rectangular shape including a first side, a second side, a third side, and a fourth side, wherein the first side and the second side are parallel to each other, and the third side and the fourth side are parallel to each other, wherein each of the first and second sides are longer in length than each of the third and fourth sides, wherein the first and second sides are parallel to the grain direction.

\* \* \* \* \*

UNITED STATES PATENT AND TRADEMARK OFFICE
CERTIFICATE OF CORRECTION

PATENT NO. : 8,500,839 B2
APPLICATION NO. : 12/768433
DATED : August 6, 2013
INVENTOR(S) : LaMonte A. Crabtree et al.

Page 1 of 1

It is certified that error appears in the above-identified patent and that said Letters Patent is hereby corrected as shown below:

In the Claims

Col. 16, lines 14-25, Claim 26 should read

26. A method of forming a panel filter having a metal screen only on one side, comprising:

pleating filter media to form a pleated filter media having pleat tips on opposed sides;

bonding a metal screen to the pleat tips on one of the opposed sides of the pleated filter media;

jacketing the pleated filter media in a panel frame, thereby forming the panel filter having a metal screen only on one side; and wherein the jacketing includes die cutting the panel frame from a paperboard material and preconditioning the panel frame by drying the panel frame to a reduced moisture content.

Signed and Sealed this
Twenty-fifth Day of February, 2014

Michelle K. Lee
*Deputy Director of the United States Patent and Trademark Office*